(12) United States Patent
Chen et al.

(10) Patent No.: US 10,841,441 B2
(45) Date of Patent: Nov. 17, 2020

(54) SCANNING DEVICE AND MULTIFUNCTION PRINTER HAVING SIMPLER STRUCTURES AND SMALLER VOLUMES

(71) Applicant: Foxlink Image Technology Co., Ltd., New Taipei (TW)

(72) Inventors: Chi Wen Chen, New Taipei (TW); Wei Xiang Tsai, New Taipei (TW); Hsing Hung Lee, New Taipei (TW); Yi Hsuan Lin, New Taipei (TW)

(73) Assignee: Foxlink Image Technology Co., Ltd., New Taipei (TW)

(*) Notice: Subject to any disclaimer, the term of this patent is extended or adjusted under 35 U.S.C. 154(b) by 0 days.

(21) Appl. No.: 16/668,330

(22) Filed: Oct. 30, 2019

(65) Prior Publication Data

US 2020/0169642 A1 May 28, 2020

Related U.S. Application Data

(60) Provisional application No. 62/771,903, filed on Nov. 27, 2018.

(51) Int. Cl.
*H04N 1/31* (2006.01)
*H04N 1/00* (2006.01)

(52) U.S. Cl.
CPC ..... *H04N 1/00525* (2013.01); *H04N 1/00551* (2013.01)

(58) Field of Classification Search
CPC ............. H04N 1/00525; H04N 1/0053; H04N 1/00519
USPC ................ 358/3.32, 505, 401; 271/264, 3.14
See application file for complete search history.

(56) References Cited

U.S. PATENT DOCUMENTS

2007/0177226 A1* 8/2007 Ishida ................ H04N 1/00543
358/474
2011/0148034 A1* 6/2011 Inoue ................ G03G 21/1633
271/264

\* cited by examiner

*Primary Examiner* — Jamares Q Washington
(74) *Attorney, Agent, or Firm* — Lin & Associates Intellectual Property, Inc.

(57) ABSTRACT

A scanning device includes an outer shell, a glass platform, a contact image sensor, a paper feeding unit and an upper cover. An inside of the outer shell has an accommodating space. The glass platform is disposed to the outer shell. The glass platform includes an automatic paper fed and scanned area, and a static paper scan area. The contact image sensor is disposed in the accommodating space. The paper feeding unit is disposed to a top surface of the automatic paper fed and scanned area. The upper cover is pivotally disposed to a top surface of the static paper scan area. A top surface of the upper cover is recessed downward to form a paper loading groove.

12 Claims, 8 Drawing Sheets

SCANNING DEVICE AND MULTIFUNCTION PRINTER HAVING SIMPLER STRUCTURES AND SMALLER VOLUMES

CROSS-REFERENCE TO RELATED APPLICATION

The present application claims the priority of U.S. Provisional Patent Application No. 62/771,903, filed on Nov. 27, 2018, which is hereby incorporated by reference herein in its entirety.

BACKGROUND OF THE INVENTION

1. Field of the Invention

The present invention generally relates to a scanning device and a multifunction printer including the scanning device, and more particularly to a scanning device, and a multifunction printer including the scanning device, which have simpler structures and smaller volumes.

2. The Related Art

A multifunction printer has various functions of scanning, copying, line printing and fax, so the multifunction printer includes a scanning device and a printing device, at least.

Referring to FIG. 8, a conventional scanning device used in a conventional multifunction printer includes a platbed scanning unit 80, and an paper feeding unit 84 pivotally connected to a top surface of the platbed scanning unit 80. The platbed scanning unit 80 includes a glass platform 81, a contact image sensor (CIS) 82 disposed under the glass platform 81, and an image sensing movement module 83. The paper feeding unit 84 includes a feeding unit shell 85, a paper tray 86 disposed to a surface of the feeding unit shell 85, a paper returning tray 87 disposed to the surface of the feeding unit shell 85, a paper feeding channel 88 connected between the paper tray 86 and the paper returning tray 87, and two paper feeding rollers 89 disposed inside the feeding unit shell 85. The paper feeding channel 88 includes a scanning section 88a, and a side wall of the scanning section 88a is partially covered by the glass platform 81. The two paper feeding rollers 89 are disposed to an upstream and a downstream of the scanning section 88a. The paper feeding unit 84 makes a paper passing through the scanning section 88a keep flat by virtue of the two paper feeding rollers 89. So when a paper is fed through the scanning section 88a, the paper is scanned by a contact image sensor 30 disposed under the glass platform 81.

However, the platbed scanning unit 80 is mainly used for scanning the single paper and the paper which is hard to be bent and pass through the paper feeding channel 88, such as a card, a book and a hard certificate card, whereas, the paper feeding unit 84 is mainly used for scanning a large number of the same sized papers. Moreover, the conventional scanning device is limited by a structure design of the conventional scanning device, the conventional scanning device hardly reduces a volume of the conventional scanning device.

Thus it is essential to provide an innovative scanning device, and an innovative multifunction printer including the innovative scanning device, the innovative scanning device and the multifunction printer have simpler structures and smaller volumes.

SUMMARY OF THE INVENTION

An object of the present invention is to provide a scanning device. The scanning device includes an outer shell, a glass platform, a contact image sensor, a paper feeding unit and an upper cover. An inside of the outer shell has an accommodating space. The glass platform is disposed to a top surface of the outer shell. The glass platform includes an automatic paper fed and scanned area, and a static paper scan area. The contact image sensor is disposed in the accommodating space, and the contact image sensor is disposed under the glass platform. The paper feeding unit is disposed to a top surface of the automatic paper fed and scanned area for feeding a paper carrier through the automatic paper fed and scanned area. The upper cover is pivotally disposed to a top surface of the static paper scan area. A top surface of the upper cover is recessed downward to form a paper loading groove. An axis direction of a pivoting shaft of the upper cover is perpendicular to a paper feeding direction of the paper feeding unit feeding the paper carrier, the paper loading groove is adjacent to a paper feeding side of the automatic paper fed and scanned area, so that the paper carrier which is to be scanned is guided by the paper loading groove to enter the paper feeding unit. The contact image sensor includes a sensor array, a driving motor connected with the sensor array, a driving gear connected with the driving motor, and a spline fastened to the outer shell, the driving gear is engaged with the driving motor, the sensor array is driven by the driving motor to move in the accommodating space.

Another object of the present invention is to provide a scanning device. The scanning device includes an outer shell, a glass platform, a contact image sensor, a paper feeding unit, a paper guiding unit and an upper cover. An inside of the outer shell has an accommodating space. The glass platform is disposed to a top surface of the outer shell. The glass platform includes an automatic paper fed and scanned area, and a static paper scan area. An inner surface of a front wall of the outer shell is flush with a front surface of the glass platform. The contact image sensor is disposed in the accommodating space, and the contact image sensor is disposed under the glass platform. The paper feeding unit is disposed to a top surface of the automatic paper fed and scanned area. The upper cover is pivotally disposed to a top surface of the static paper scan area. A top surface of the upper cover is recessed downward to form a paper loading groove. A rear end of a bottom surface of the upper cover protrudes downward to form a pivoting shaft. The paper guiding unit is mounted to the outer shell. The paper guiding unit is disposed to one side of the paper feeding unit to guide and feed out a scanned paper carrier. The paper guiding unit includes a paper-out guiding block disposed to a paper-out side of the automatic paper fed and scanned area, the paper-out guiding block includes an oblique surface facing the automatic paper fed and scanned area, and a guiding board pivotally disposed to the paper-out side of the automatic paper fed and scanned area. An axis direction of the pivoting shaft of the upper cover is perpendicular to a paper feeding direction of the paper feeding unit feeding the paper carrier, the paper loading groove is adjacent to a paper feeding side of the automatic paper fed and scanned area, so that the paper carrier which is to be scanned is guided by the paper loading groove to enter the paper feeding unit.

Another object of the present invention is to provide a multifunction printer. The multifunction printer includes a scanning device, and a line printer unit mounted under the scanning device. The scanning device includes an outer shell, a glass platform, a contact image sensor, a paper feeding unit and an upper cover. An inside of the outer shell has an accommodating space. The glass platform is disposed to a top surface of the outer shell. The glass platform includes an automatic paper fed and scanned area, and a static paper scan area. The contact image sensor is disposed in the accommodating space. The paper feeding unit is disposed to a top surface of the automatic paper fed and scanned area for feeding a paper carrier through the automatic paper fed and scanned area. The upper cover is pivotally disposed to a top surface of the static paper scan area. A top surface of the upper cover is recessed downward to form a paper loading groove. A rear end of a bottom surface of the upper cover protrudes downward to form a pivoting shaft. An axis direction of the pivoting shaft of the upper cover is perpendicular to a paper feeding direction of the paper feeding unit feeding the paper carrier, the paper loading groove is adjacent to a paper feeding side of the automatic paper fed and scanned area, so that the paper carrier which is to be scanned is guided by the paper loading groove to enter the paper feeding unit. The line printer unit includes a paper box, a printing assembly, and a feeding assembly connected and disposed between the paper box and the printing assembly. The paper carrier to be printed is fed to the printing assembly from the paper box to be printed by the feeding assembly. The contact image sensor includes a sensor array, a driving motor connected with the sensor array, a driving gear connected with the driving motor, and a spline fastened to the outer shell, the driving gear is engaged with the driving motor, the sensor array is driven by the driving motor to move in the accommodating space.

As described above, the inner surface of the front wall of the outer shell is flush with the front surface of the glass platform, and when the scanning device scans the book, a position of placing the book is nearer to the static paper scan area through a design of the inclined surface, so that a scanning blind angle of the scanning device is eliminated, and the scanning device and the multifunction printer have simpler structures and smaller volumes.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
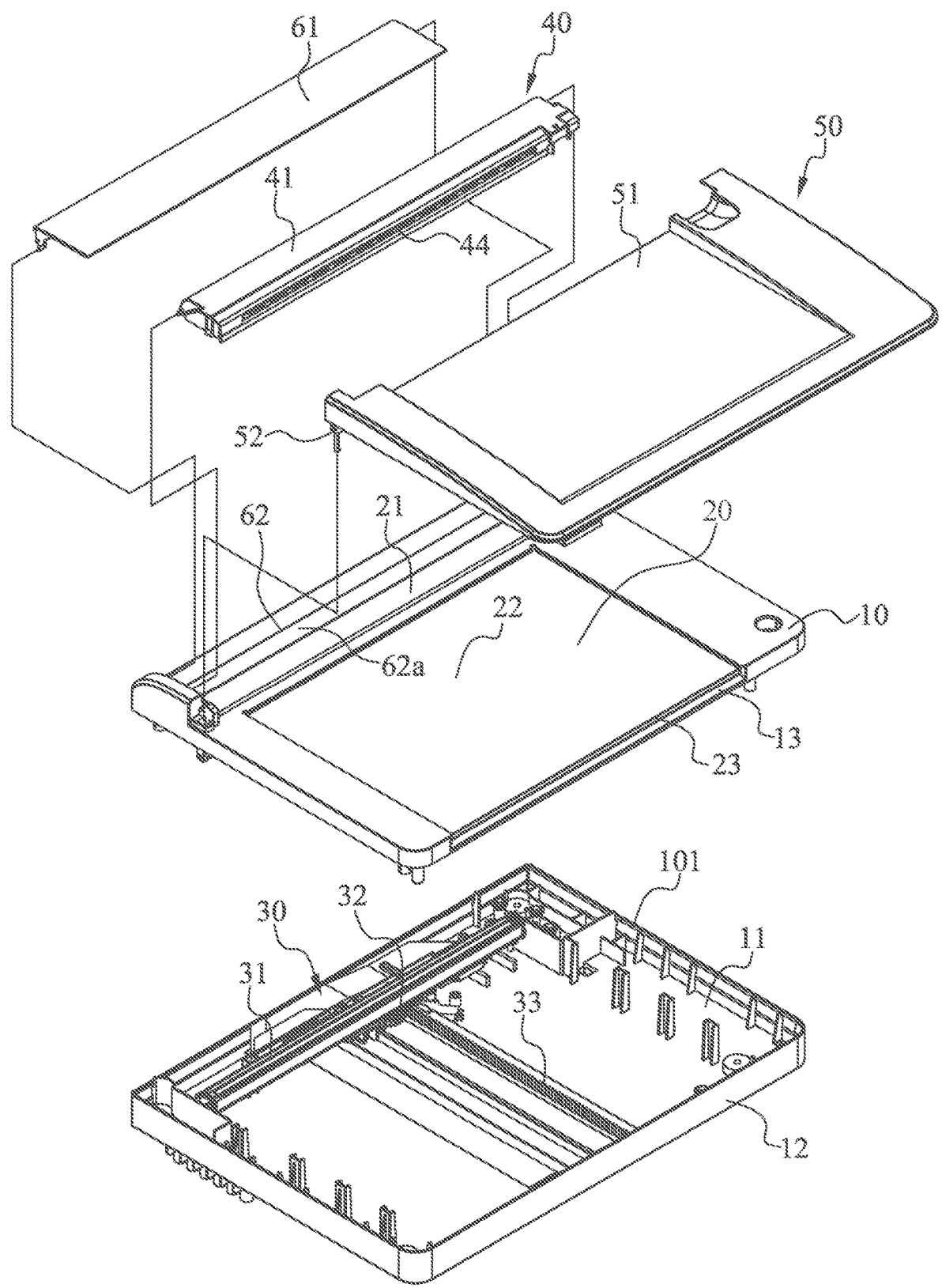
FIG. 1 is an exploded perspective view of a scanning device in accordance with a preferred embodiment of the present invention.

With reference to FIG. 1 to FIG. 7, a scanning device 100, and a multifunction printer 200 including the scanning device 100 in accordance with a preferred embodiment of the present invention are shown. The scanning device 100 includes an outer shell 10, a glass platform 20, a contact image sensor 30, a paper feeding unit 40, an upper cover 50 and a paper guiding unit 60.

The outer shell 10 is of a hollow cuboid shape. An inside of the outer shell 10 has an accommodating space 11. The outer shell 10 has a peripheral wall 101 surrounding the accommodating space 11. A front of the peripheral wall 101 is defined as a front wall 12. The glass platform 20 is disposed to a top surface of the outer shell 10. The glass platform 20 includes an automatic paper fed and scanned area 21, and a static paper scan area 22. The contact image sensor 30 is disposed in the accommodating space 11 for scanning a paper carrier, and the contact image sensor 30 is disposed under the glass platform 20. The paper feeding unit 40 is disposed to a top surface of the automatic paper fed and scanned area 21 for feeding the paper carrier through the automatic paper fed and scanned area 21. The upper cover 50 is pivotally disposed to a top surface of the static paper scan area 22. The paper feeding unit 40 is disposed behind the upper cover 50. A top surface of the upper cover 50 is recessed downward to form a paper loading groove 51 for loading the paper carrier. One side of a rear end of a bottom surface of the upper cover 50 protrudes downward to form a pivoting shaft 52. The paper loading groove 51 is located above and adjacent to a paper feeding side of the automatic paper fed and scanned area 21, so that the paper carrier which is to be scanned is guided by the paper loading groove 51 to enter the paper feeding unit 40 of the scanning device 100. The paper guiding unit 60 is mounted to the outer shell 10. The paper guiding unit 60 is disposed to one side of the paper feeding unit 40 to guide and feed out the scanned paper carrier. The paper carrier includes a book and a static paper.

In the present invention, the scanning device 100 and the multifunction printer 200 including the scanning device 100, have simpler structures and smaller volumes by virtue of the scanning device 100 and the multifunction printer 200 disposing the paper feeding unit 40, the upper cover 50 and the paper guiding unit 60 separated from one another.

In the preferred embodiment, the contact image sensor 30 includes a sensor array 31, a driving motor 301 connected with the sensor array 31, a driving gear 32 connected with the driving motor 301, and a spline 33 fastened to the outer shell 10. The driving gear 32 is engaged with the driving motor 301, so when the driving motor 301 rotates, the sensor array 31 is driven by the driving motor 301 to move in the accommodating space 11.

Referring to FIG. 1 to FIG. 6, the paper feeding unit 40 is pivotally disposed to a top surface of the automatic paper fed and scanned area 21 for facilitating a user to eliminate a breakdown at the time of an unusual condition including a paper jam condition of the scanning device 100 being happened. In the preferred embodiment, the paper feeding unit 40 includes a paper feeding shell 41, a paper feeding roller 42, a guiding shrapnel 43 and a paper feeding sensor 44. A transverse length of the paper feeding roller 42 covers the whole automatic paper fed and scanned area 21. The paper feeding roller 42 is disposed inside the paper feeding shell 41, and is adhered to the glass platform 20, so that the paper carrier is fed through the automatic paper fed and scanned area 21. The paper feeding roller 42 contacts with the glass platform 20 for feeding the paper carrier. In order to ensure that the paper feeding roller 42 is able to feed the paper smoothly and neatly, the guiding shrapnel 43 has a flexibility in a direction perpendicular to a feeding path direction which is a paper feeding direction of the paper feeding unit 40, and the guiding shrapnel 43 is easily changed according to a surface shape of the paper feeding roller 42. The guiding shrapnel 43 is disposed to a paper feeding side of the paper feeding unit 40. The guiding shrapnel 43 includes a fastening end 43a connected with the paper feeding shell 41, and a free end 43b. The free end 43b of the guiding shrapnel 43 abuts against the paper feeding roller 42 for guiding the paper carrier. The paper feeding sensor 44 is disposed to the paper feeding side of the paper feeding roller 42 for sensing the entered paper carrier. When the paper feeding sensor 44 senses the paper carrier, the paper feeding roller 42 is started.

The paper guiding unit 60 includes a paper-out guiding block 62 disposed to a paper-out side of the automatic paper fed and scanned area 21. The paper-out guiding block 62 includes an oblique surface 62a facing the automatic paper fed and scanned area 21, and a guiding board 61. The guiding board 61 is pivotally disposed to the paper-out side of the automatic paper fed and scanned area 21. A moving direction of the paper carrier fed out of the automatic paper fed and scanned area 21 is changed through a cooperation between the paper-out guiding block 62 and the guiding board 61, so that the user is facilitated to recycle the paper carrier.

In the preferred embodiment, a top of the outer shell 10 away from the pivoting shaft 52 of the upper cover 50 is inclined frontward and downward to form an inclined surface 13. A front surface 23 of the glass platform 20 is disposed vertically. The inclined surface 13 abuts against the front surface 23 of the glass platform 20 neatly. An inner surface of the front wall 12 of the outer shell 10 is flush with the front surface 23 of the glass platform 20, so that a scanning blind angle of the scanning device 100 is eliminated. An axis direction of the pivoting shaft 52 of the upper cover 50 is perpendicular to the paper feeding direction of the paper feeding unit 40 feeding the paper carrier.

Figure 2:
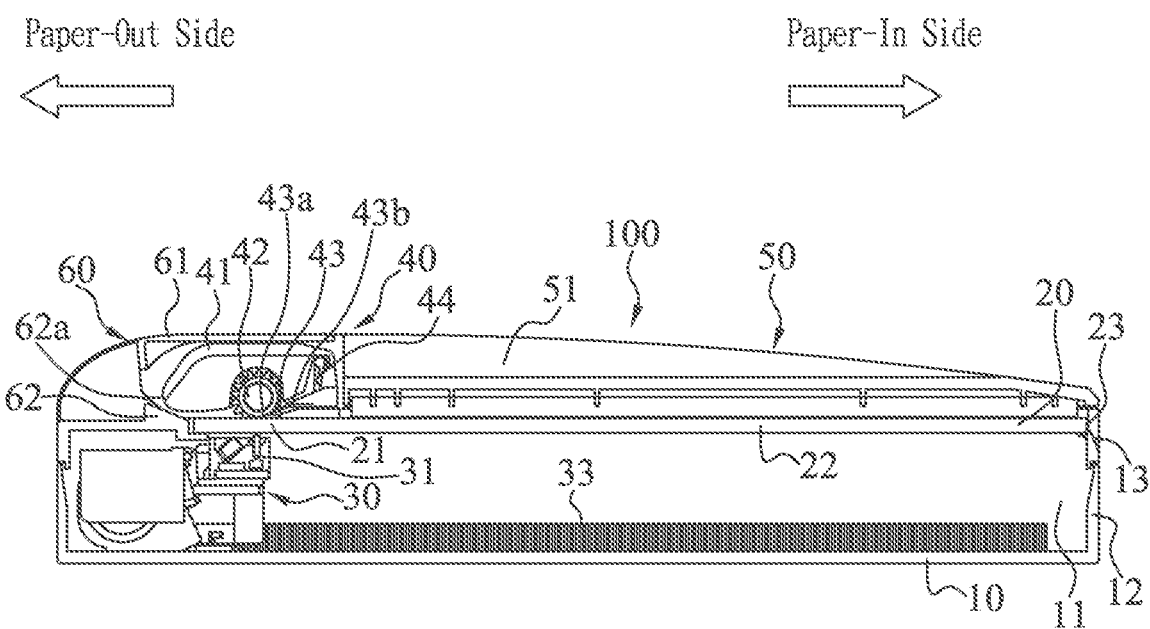
FIG. 2 is a cross-sectional perspective view of the scanning device of FIG. 1.
Figure 3:
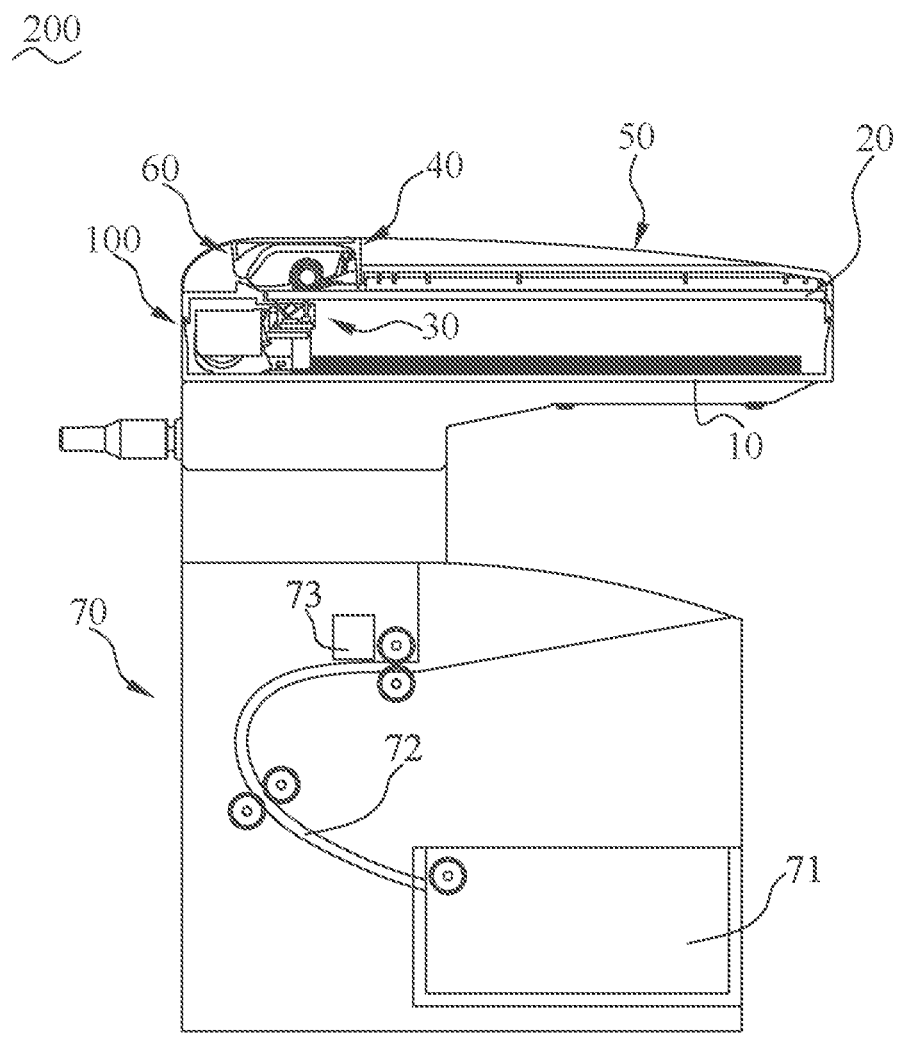
FIG. 3 is a cross-sectional perspective view of a multifunction printer including the scanning device of FIG. 1.
Figure 4:
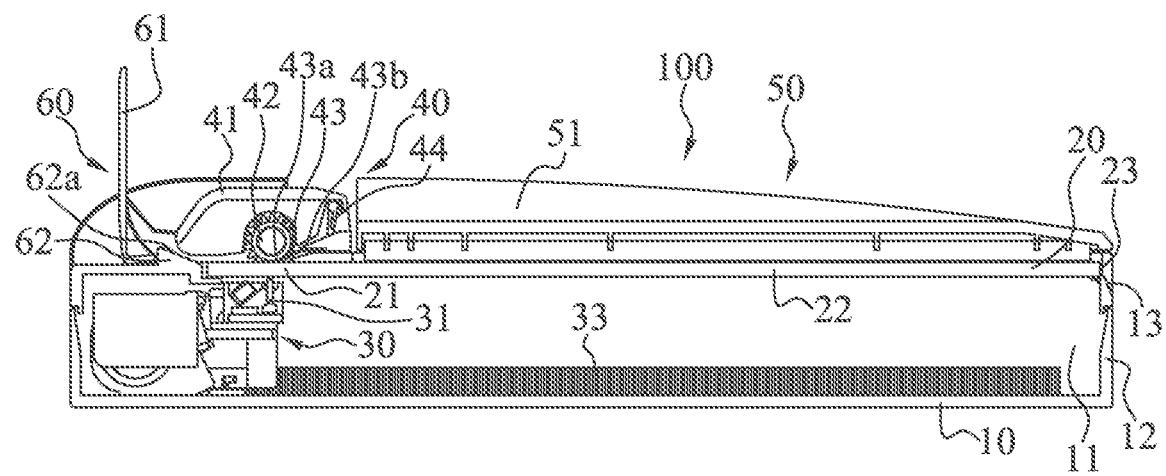
FIG. 4 is a schematic diagram showing that the scanning device in accordance with the present invention proceeds with an automatically feeding and scanning paper action.
Figure 5:
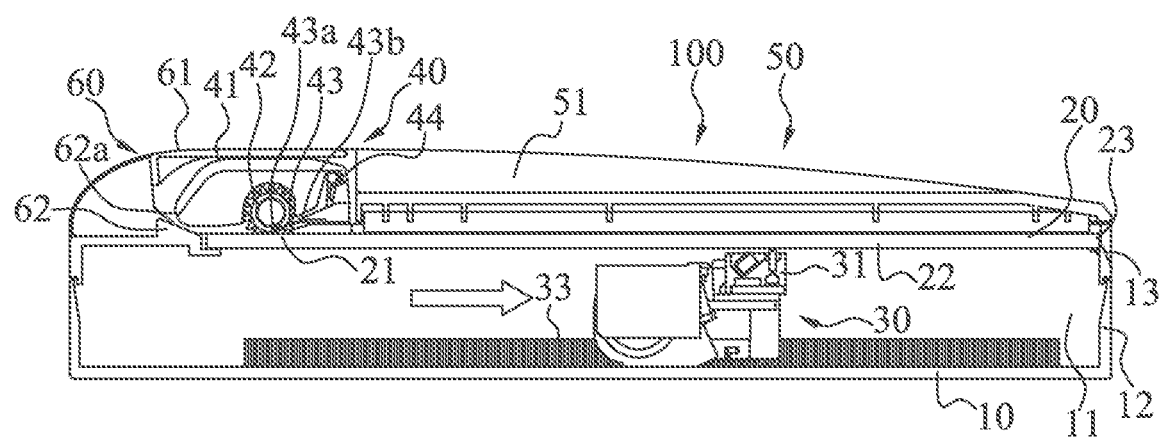
FIG. 5 is a schematic diagram showing that the scanning device in accordance with the present invention proceeds with a static paper scanned action.

Referring to FIG. 1 to FIG. 3, the multifunction printer 200 includes the scanning device 100, and a line printer unit 70 mounted under the scanning device 100. The line printer unit 70 includes a paper box 71 for storing the paper carrier which is to be scanned, a printing assembly 73, and a feeding assembly 72 connected and disposed between the paper box 71 and the printing assembly 73. The paper carrier to be printed is fed to the printing assembly 73 from the paper box 71 to be printed by the feeding assembly 72. The scanning device 100 is disposed above the line printer unit 70. Because sizes of exterior shapes of the scanning device 100 and the line printer unit 70 are limited to be must be larger than sizes of the paper carrier, so the paper feeding direction of the paper feeding unit 40 is parallel with a paper feeding direction of the feeding assembly 72, and correspondingly size limitations of the scanning device 100 and the line printer unit 70 are uniform.

Referring to FIG. 1 to FIG. 6, when the scanning device 100 feeds and scans the paper carrier automatically, the paper feeding unit 40 is disposed to the top surface of the automatic paper fed and scanned area 21 for feeding the paper carrier through the automatic paper fed and scanned area 21. Specifically, when the paper feeding sensor 44 senses the paper carrier, the paper feeding roller 42 is started to feed the paper carrier through the automatic paper fed and scanned area 21.

Referring to FIG. 1, FIG. 2, FIG. 5 and FIG. 7, when the scanning device 100 scans the static paper, after the user positioned the paper carrier to the static paper scan area 22, the sensor array 31 is driven to scan through the static paper scan area 22 by virtue of the driving motor 301, the driving gear 32 and the spline 33 continuing actuating, and image information of the paper carrier is acquired.

Figure 6:
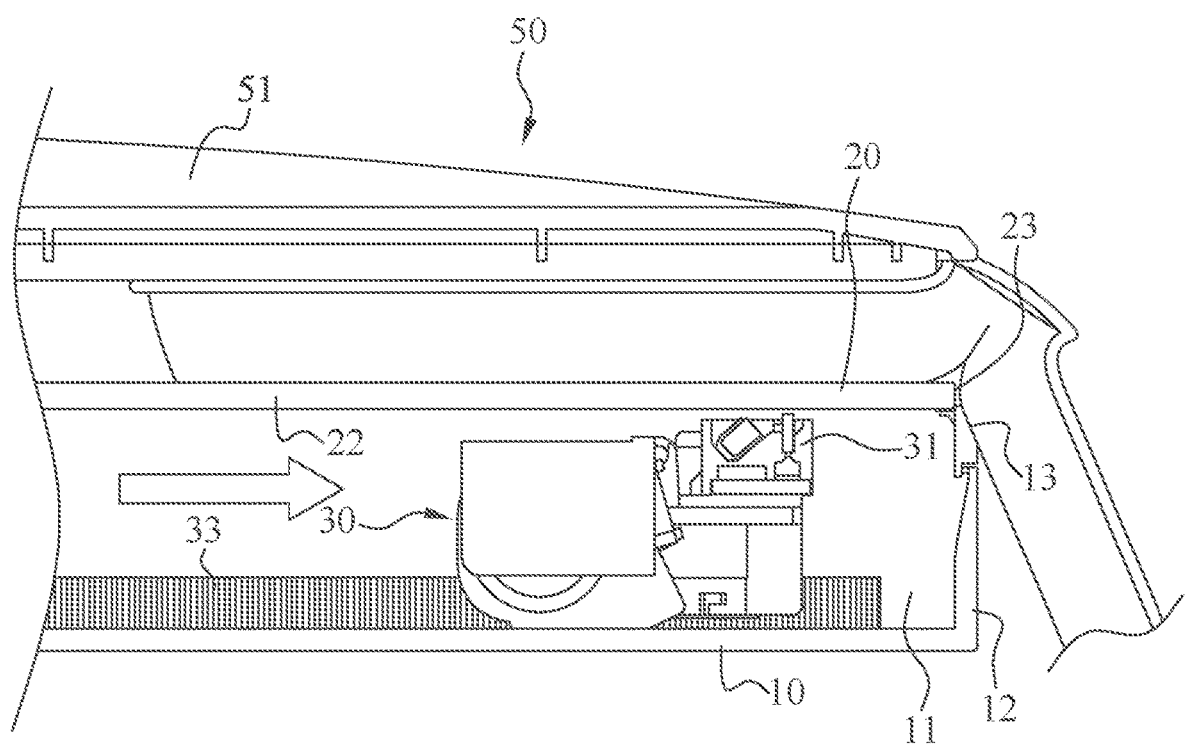
FIG. 6 is a schematic diagram showing that the scanning device proceeds with a book scanned action.
Figure 7:
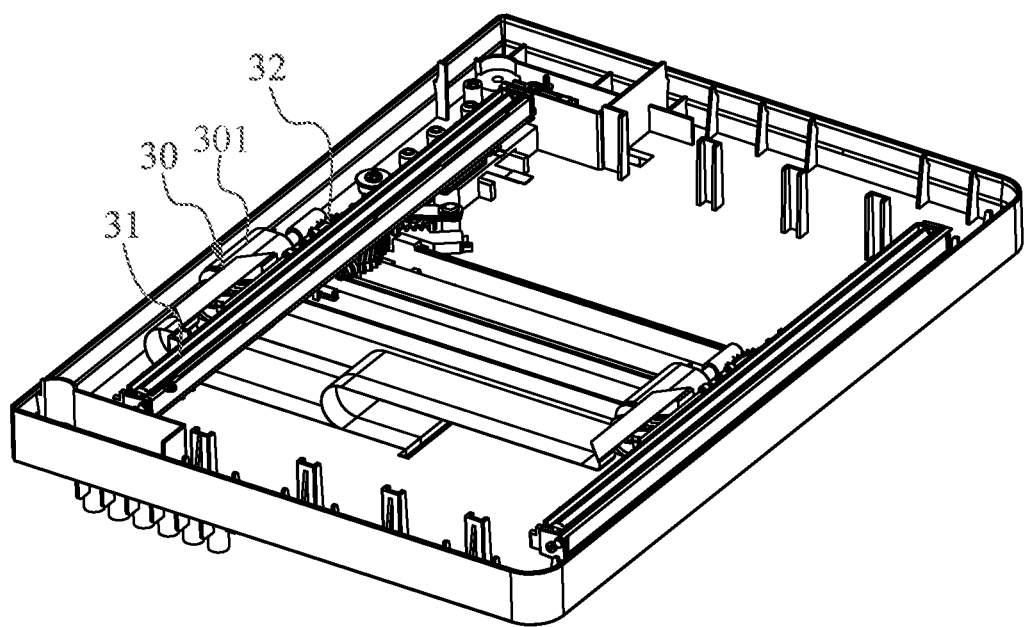
FIG. 7 is a partially perspective view of the scanning device in accordance with the present invention.
Figure 8:
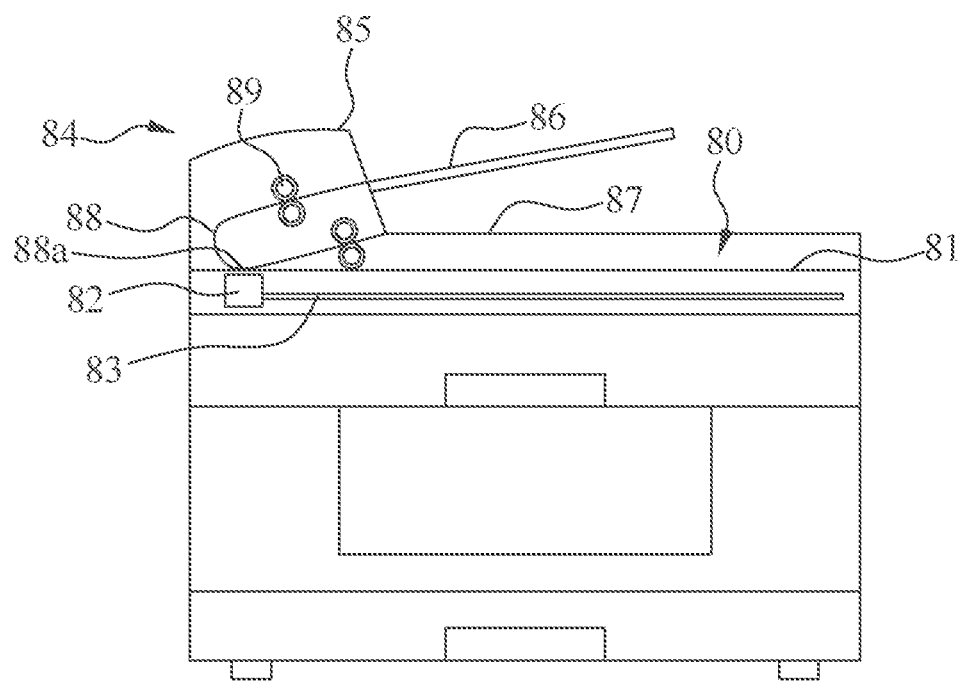
FIG. 8 is a conventional multifunction printer in prior art.

Referring to FIG. 1, FIG. 2 and FIG. 6, when the scanning device 100 scans the book, a position of placing the book is nearer to the static paper scan area 22 through a design of the inclined surface 13, so that the scanning blind angle of the scanning device 100 is eliminated.

As described above, the inner surface of the front wall 12 of the outer shell 10 is flush with the front surface 23 of the glass platform 20, and when the scanning device 100 scans the book, the position of placing the book is nearer to the static paper scan area 22 through the design of the inclined surface 13, so that the scanning blind angle of the scanning device 100 is eliminated, and the scanning device 100 and the multifunction printer 200 have simpler structures and smaller volumes.

What is claimed is:

1. A scanning device, comprising:
    an outer shell, an inside of the outer shell having an accommodating space;
    a glass platform disposed to a top surface of the outer shell, the glass platform including an automatic paper fed and scanned area, and a static paper scan area;
    a contact image sensor disposed in the accommodating space, and the contact image sensor being disposed under the glass platform, the contact image sensor including a sensor array, a driving motor connected with the sensor array, a driving gear connected with the driving motor, and a spline fastened to the outer shell, the driving gear being engaged with the driving motor, the sensor array being driven by the driving motor to move in the accommodating space;
    a paper feeding unit disposed to a top surface of the automatic paper fed and scanned area for feeding a paper carrier through the automatic paper fed and scanned area; and
    an upper cover pivotally disposed to a top surface of the static paper scan area, a top surface of the upper cover being recessed downward to form a paper loading groove,
    wherein an axis direction of a pivoting shaft of the upper cover is perpendicular to a paper feeding direction of the paper feeding unit feeding the paper carrier, the paper loading groove is adjacent to a paper feeding side of the automatic paper fed and scanned area, so that the paper carrier which is to be scanned is guided by the paper loading groove to enter the paper feeding unit.

2. The scanning device as claimed in claim 1, wherein the paper feeding unit includes a paper feeding shell, a paper feeding roller disposed inside the paper feeding shell, a guiding shrapnel and a paper feeding sensor, a transverse length of the paper feeding roller covers the whole automatic paper fed and scanned area, the paper feeding roller contacts with the glass platform for feeding the paper carrier, the guiding shrapnel has a flexibility in a direction perpendicular to a feeding path direction which is the paper feeding direction of the paper feeding unit, the guiding shrapnel includes a fastening end connected with the paper feeding shell, and a free end, the free end abuts against the paper feeding roller for guiding the paper carrier, the paper feeding sensor is disposed to a paper feeding side of the paper feeding roller for sensing the entered paper carrier, when the paper feeding sensor senses the paper carrier, the paper feeding roller is started.

3. The scanning device as claimed in claim 1, wherein the paper feeding unit is pivotally disposed to the top surface of the automatic paper fed and scanned area for feeding the paper carrier through the automatic paper fed and scanned area.

4. The scanning device as claimed in claim 1, further comprising a paper guiding unit mounted to the outer shell, the paper guiding unit being disposed to one side of the paper feeding unit to guide and feed out the scanned paper carrier, the paper guiding unit including a paper-out guiding block disposed to a paper-out side of the automatic paper fed and scanned area, the paper-out guiding block including an oblique surface facing the automatic paper fed and scanned area, and a guiding board pivotally disposed to the paper-out side of the automatic paper fed and scanned area.

5. The scanning device as claimed in claim 1, wherein an inner surface of a front wall of the outer shell is flush with a front surface of the glass platform.

6. The scanning device as claimed in claim 1, wherein a top of the outer shell away from the pivoting shaft of the upper cover is inclined frontward and downward to form an inclined surface.

7. A scanning device, comprising:
an outer shell, an inside of the outer shell having an accommodating space;
a glass platform disposed to a top surface of the outer shell, the glass platform including an automatic paper fed and scanned area, and a static paper scan area, an inner surface of a front wall of the outer shell being flush with a front surface of the glass platform;
a contact image sensor disposed in the accommodating space, and the contact image sensor being disposed under the glass platform;
a paper feeding unit disposed to a top surface of the automatic paper fed and scanned area;
a paper guiding unit mounted to the outer shell, the paper guiding unit being disposed to one side of the paper feeding unit to guide and feed out a scanned paper carrier, the paper guiding unit including a paper-out guiding block disposed to a paper-out side of the automatic paper fed and scanned area, the paper-out guiding block including an oblique surface facing the automatic paper fed and scanned area, and a guiding board pivotally disposed to the paper-out side of the automatic paper fed and scanned area; and
an upper cover pivotally disposed to a top surface of the static paper scan area, a top surface of the upper cover being recessed downward to form a paper loading groove, a rear end of a bottom surface of the upper cover protruding downward to form a pivoting shaft,
wherein an axis direction of the pivoting shaft of the upper cover is perpendicular to a paper feeding direction of the paper feeding unit feeding the paper carrier, the paper loading groove is adjacent to a paper feeding side of the automatic paper fed and scanned area, so that the paper carrier which is to be scanned is guided by the paper loading groove to enter the paper feeding unit.

8. A multifunction printer, comprising:
a scanning device including
an outer shell, an inside of the outer shell having an accommodating space,
a glass platform disposed to a top surface of the outer shell, the glass platform including an automatic paper fed and scanned area, and a static paper scan area,
a contact image sensor disposed in the accommodating space,
a paper feeding unit disposed to a top surface of the automatic paper fed and scanned area for feeding a paper carrier through the automatic paper fed and scanned area, and
an upper cover pivotally disposed to a top surface of the static paper scan area, a top surface of the upper cover being recessed downward to form a paper loading groove, a rear end of a bottom surface of the upper cover protruding downward to form a pivoting shaft, an axis direction of the pivoting shaft of the upper cover is perpendicular to a paper feeding direction of the paper feeding unit feeding the paper carrier, the paper loading groove is adjacent to a paper feeding side of the automatic paper fed and scanned area, so that the paper carrier which is to be scanned is guided by the paper loading groove to enter the paper feeding unit; and
a line printer unit mounted under the scanning device, including a paper box, a printing assembly, and a feeding assembly connected and disposed between the paper box and the printing assembly, the paper carrier to be printed being fed to the printing assembly from the paper box to be printed by the feeding assembly,
wherein the contact image sensor includes a sensor array, a driving motor connected with the sensor array, a driving gear connected with the driving motor, and a spline fastened to the outer shell, the driving gear is engaged with the driving motor, the sensor array is driven by the driving motor to move in the accommodating space.

9. The multifunction printer as claimed in claim 8, wherein the paper feeding unit includes a paper feeding shell, a paper feeding roller disposed inside the paper feeding shell, a guiding shrapnel and a paper feeding sensor, a transverse length of the paper feeding roller covers the whole automatic paper fed and scanned area, the paper feeding roller contacts with the glass platform for feeding the paper carrier, the guiding shrapnel has a flexibility in a direction perpendicular to a feeding path direction which is the paper feeding direction of the paper feeding unit, the guiding shrapnel includes a fastening end connected with the paper feeding shell, and a free end, the free end abuts against the paper feeding roller for guiding the paper carrier, the paper feeding sensor is disposed to a paper feeding side of the paper feeding roller for sensing the entered paper carrier, when the paper feeding sensor senses the paper carrier, the paper feeding roller is started.

10. The multifunction printer as claimed in claim 8, further comprising a paper guiding unit mounted to the outer shell, the paper guiding unit being disposed to one side of the paper feeding unit to guide and feed out the scanned paper carrier out, the paper guiding unit including a paper-out guiding block disposed to a paper-out side of the automatic paper fed and scanned area, the paper-out guiding block including an oblique surface facing the automatic paper fed and scanned area, and a guiding board pivotally disposed to the paper-out side of the automatic paper fed and scanned area.

11. The multifunction printer as claimed in claim 8, wherein an inner surface of a front wall of the outer shell is flush with a front surface of the glass platform.

12. The multifunction printer as claimed in claim 8, wherein a top of the outer shell away from the pivoting shaft of the upper cover is inclined frontward and downward to form an inclined surface.

* * * * *